United States Patent
Smith et al.

[11] Patent Number: 6,141,763
[45] Date of Patent: Oct. 31, 2000

[54] SELF-POWERED NETWORK ACCESS POINT

[75] Inventors: Mark T. Smith, San Mateo, Calif.; Gerald G. Maguire, Jr., Stokholm, Sweden

[73] Assignee: Hewlett-Packard Company, Palo Alto, Calif.

[21] Appl. No.: 09/144,965

[22] Filed: Sep. 1, 1998

[51] Int. Cl.$^7$ .................................................... G06F 1/26
[52] U.S. Cl. .......................................... 713/300; 709/200
[58] Field of Search .................................. 709/200–253; 713/300, 310

[56] References Cited

U.S. PATENT DOCUMENTS

| | | | |
|---|---|---|---|
| 4,314,306 | 2/1982 | Darrow | 361/182 |
| 4,373,117 | 2/1983 | Pierce | 179/2 DP |
| 5,438,678 | 8/1995 | Smith | 395/750 |
| 5,491,402 | 2/1996 | Small | 323/282 |
| 5,550,985 | 8/1996 | Miller et al. | 395/750 |
| 5,569,307 | 10/1996 | Schulman et al. | 607/56 |
| 5,876,425 | 3/1999 | Gord et al. | 607/56 |
| 5,959,547 | 9/1999 | Tubel et al. | 340/853.2 |
| 5,974,553 | 10/1999 | Gandar | 713/300 |

*Primary Examiner*—Ayaz R. Sheikh
*Assistant Examiner*—David A. Wiley

[57] ABSTRACT

A system for providing operational power to network access points includes a router having an external power supply to transmit network signals to the network access points. Each self-powered access point includes power extraction circuitry for extracting power from the network signals and a power storage subsystem for storing the extracted power. Signal conversion circuitry is connected to the power storage subsystem for receiving operating power to perform signal conversion of received network signals addressed to a computer and to reconfigure data received from the computer for transmission over the network. In a preferred embodiment, the power extraction circuitry includes a full-power extraction mode and a partial power extraction mode. A data analyzer monitors received network signals to determine whether the signals are required by the computer for processing. If a signal is required for processing, the data analyzer enables the partial power extraction mode in the power extraction circuitry to preserve a minimum signal power required by the computer for signal processing. If the signal is not required for processing, the data analyzer enables the full power extraction mode to extract substantially all power from the signal. Power level detection circuitry determines whether the power storage subsystem stores a minimum power level. If a power level below the minimum is detected, the power level detection circuitry disables the data analyzer and enables the full power extraction mode of the power extraction circuitry until the minimum power is achieved, at which time the data analyzer is re-enabled.

19 Claims, 5 Drawing Sheets

SELF-POWERED NETWORK ACCESS POINT

TECHNICAL FIELD

The invention relates to a system and method for providing power to devices connected to a communications network and, more specifically, to a system and method for extracting power from network signals for powering devices connected to the network.

DESCRIPTION OF THE RELATED ART

Portable computers have significantly increased in popularity, in part because advances have made portable, or laptop, computers sufficiently powerful to efficiently perform most tasks required of typical computer users. The portability of these devices enables a user to operate the computers at multiple locations, whereas previously the user was limited to utilizing the computer at a single location, for instance the user's office.

A rapid growth of networking technology has paralleled the proliferation of portable computers. The combination of networking technology and portable computers has made it possible for portable computer users to connect to networks, such as the Internet, at multiple locations, so as to access network resources from multiple access points. Each access point requires a power source in order to connect a device, such as a portable computer, to a network.

When a building is being constructed, the expense of accommodating power supply requirements for each potential access point of a local area network (LAN) may be substantial. The power connections should be not only available within a particular room, but they should be convenient as well. Often an existing network, such as a LAN, must be extended to accommodate access by additional computers in response to increased computing requirements of an organization, such as a business entity. In addition to the cost of providing additional wiring for data access to the network, the organization might incur the expense of wiring access points to a power supply to provide power for the additional network access points.

One partial solution to the expense associated with installing network access points is to utilize wireless technology. For example, if a company needs to add access points to a LAN, instead of installing wiring which will connect the network media to computers throughout a building, wireless access points can be installed at a central location in the building to avoid the expense of installing the wiring. Each wireless access point also enables a portable computer with wireless transmission capability to access the LAN at the same wireless access point from a number of different locations. However, the access point itself still requires an external power source to convert received wireless signals into a format for transmission over the LAN. Providing the wireless access point with a power source represents a significant expense.

What is needed is a method and system for providing a device with an access point to a communications network without requiring provision of an external power supply to the access point.

SUMMARY OF THE INVENTION

A system for powering network access points which extracts and stores power from signals transmitted over a network includes at least one powering device on the network, such as a router, with an external power supply connection which enables signal transmission from the powering device. Each self-powered access point is enabled to extract power from signals received from the powering device and to provide communication devices connected to the self-powered access points with network access utilizing the extracted power. In a preferred embodiment, the self-powered access points are located on a computer network to provide wireless network access to computers.

Each self-powered access point includes power extraction circuitry adapted for acquiring energy from signals received over the network, a power storage subsystem connected to the power extraction circuitry for storing the acquired energy, signal conversion circuitry to convert received signals from a device, such as a computer, to a format for transmission over the physical media of the network, and a data connection to the network to enable the computer to transmit and receive messages over the network. The self-powered access point can be employed on computer networks (such as LANs) utilizing different transmission media, including coaxial cable, twisted pair wire, fiber optic cable, and wireless transmission media.

In a preferred embodiment, the power extraction circuitry has three operational modes; a first mode enabled prior to storage of a minimum power level in the power supply subsystem, and second and third modes enabled after storage of the minimum power level. Upon first being enabled, the power storage subsystem will not be sufficiently charged to provide an acceptable operating voltage to provide network access to the computer. Power level detection circuitry communicates with the power extraction circuitry, if the power level in the power storage subsystem is below the minimum level, to activate the second or third operational mode in the power extraction circuitry.

While operating in the first mode, the power extraction circuitry extracts substantially all power from all signals received over the network in order to rapidly store a sufficient charge in the power storage subsystem to allow the self-powered access point to operate. Once the power storage subsystem has accumulated a sufficient charge during this nondiscriminating stage, the power level detection circuitry initiates a data discriminatory stage by disabling the first operational mode in the power extraction circuitry and enabling a data analyzer. The data analyzer is configured to detect signals which are required for processing by the computer that is associated with the self-powered access point. The data analyzer enables the second mode upon detecting signals directed to the computer for processing.

The second mode of the power extraction circuitry enables the self-powered access point to extract power from signals which are targeted for processing by the computer that is associated with the self-powered access point, while preserving a minimum signal power required by the computer for reliable signal processing. The power extraction circuitry must not extract all power from these signals targeted for the computer, because the computer will be deprived of the data contained in the signals. While operating in the second mode, the power extraction circuitry acquires the excess energy above the minimum level required for reliable signal processing. This acquired excess energy is stored in the power storage subsystem.

If the data analyzer detects signals not specifically directed to the computer for processing, for instance signals which are intended for other devices on the network, the data analyzer enables the third mode in the power extraction circuitry. In the third mode, the power extraction circuitry extracts substantially all energy from signals determined not to be targeted for processing by the computer. A substantial increase in energy efficiency is achieved by the combination of extracting the excess energy from the signals directed to the computer and acquiring an even greater portion of the energy of signals not directed to the computer.

The function of the power extraction circuitry can be performed by a transformer inductively coupled to the physical media of the computer network, such as a twisted wire pair, and a rectifier circuit which rectifies the power extracted from the signals for storage in the power storage subsystem. However, the use of a transformer and rectifier is not critical to the invention. The function of the power storage subsystem can be performed by a capacitor arrangement, a battery, or other known devices for storing energy.

An advantage of the invention is that the power extraction circuitry enables extraction of power from network signals to provide operating power to network access points, so that an on-site external power source is not required to operate the network access points. A further advantage of the invention results from the independence of a network access point from a local power supply, so that as long as a signal transfer device on the network retains a functioning power supply, the network access point continues to be operable. Yet another advantage of the present invention is the increased energy conservation which results from extracting energy from network signals which were previously disregarded as an energy source.

DETAILED DESCRIPTION

Figure 1:
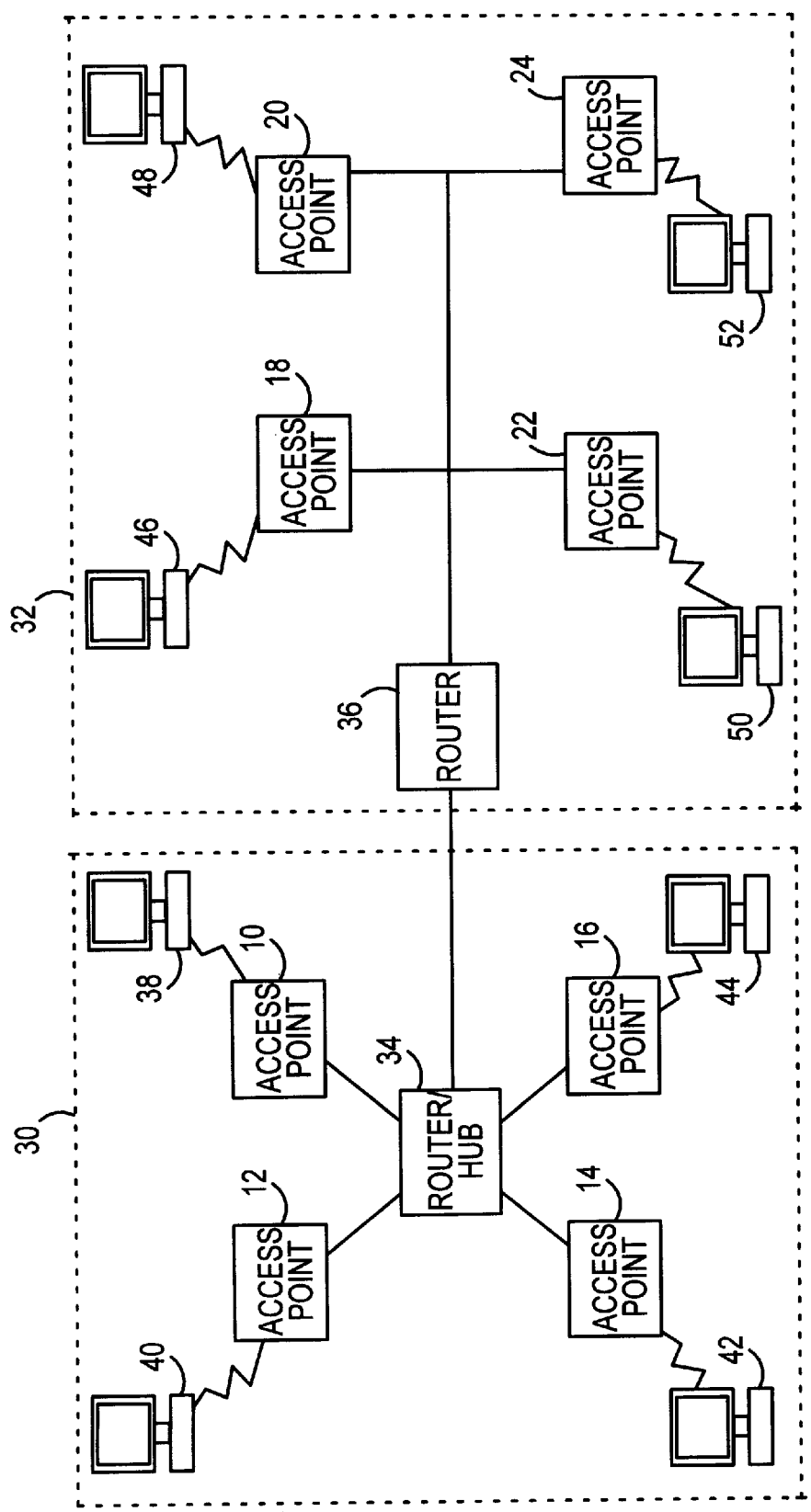
FIG. 1 illustrates a system according to the present invention for providing operating power derived from network signals to network devices.

With reference to FIG. 1, a system for providing operating power consists of multiple self-powered network access points 10, 12, 14, 16, 18, 20, 22, and 24 on first and second computer networks 30 and 32 includes a first router/hub 34 and a second router 36. The self-powered network access points provide network access to network devices which include a first set of computers 38, 40, 42, and 44 on the first network and a second set of computers 46, 48, 50, and 52 on the second network. Instead of relying on an external power supply, such as an AC mains supply, the self-powered access points obtain operational power from power extracted from signals received over the networks. Other communication devices, such as telephones and faxes, can also be connected to the networks via the self-powered access points.

The self-powered network access points utilize the power extracted from the network signals to perform signal conversion of network signals transmitted from either the router/hub 34 or the router 36 to a format compatible with transmission to an associated computer and to reconfigure data received from the associated computer to a format for transmission over one of the networks 30 or 32. For example, the computers illustrated in FIG. 1 are equipped for wireless data communication to and from the self-powered access points. When the first self-powered access point 10 receives network data addressed to the first computer 38, the first self-powered access point converts the data into a format for wireless transmission to the first computer 38. The first self-powered access point configures wireless data received from the first computer 38 to a format for transmission over the physical media of the first network which might be twisted pair copper wire, fiber optic cable, or coaxial cable.

When the first computer 38 on the first network 30 transmits data to the fifth computer 46 on the second network 32, the fifth self-powered access point 18 associated with the fifth computer can likely extract at least some of the power from the received signals. As will be discussed in greater detail below, the ability of the self-powered access point to extract power from the received signals depends in part on whether the incoming signals are specifically directed to the receiving computer for signal processing and, if so, whether the signals have more than a minimum signal power required by the receiving computer to process the incoming signal. If the received signals are intended for processing by the receiving computer, the self-powered access point extracts whatever power the signals have in excess of the minimum power required for signal processing. If the received signals are not required for processing by the receiving computer, the self-powered access point extracts substantially all of the power associated with the received signals.

In order to provide a power source for the first and second networks 30 and 32, one of the signaling devices on the networks must be powered externally, because not every signaling device on the networks can be powered exclusively by signals generated from other devices on the networks. In a preferred embodiment, a centrally located signaling device, such as the router/hub 34 and/or the router 36, is connected to a power supply, such as an AC supply. The router/hub and the router are both well adapted for providing power to the self-powered network access points, because both are centrally involved in signal communication in their respective networks. Alternatively, the power provisioning function can be provided by a hub on the network (not shown).

As will be discussed in greater detail below, each self-powered access point is capable of determining if a received signal is required by an associated computer for processing so that, if the received signal is not required by the associated computer, the self-powered access point can extract substantially all signal energy from the received signal. For instance, if the first computer 38 from the first network transmits a message to the fifth computer 46 on the second network, the router 36 can broadcast the message to all computers on the second network instead of transmitting the message only to the target fifth computer. The broadcasted message includes information indicative of the target computer's identity. The self-powered access points connected to the other computers on the second network which are not the target computers can recognize that the broadcasted message is not required for processing by the non-target computers. Consequently, the self-powered access points to which the non-target computers are attached extract substantially all signal energy from the signals comprising the broadcasted message.

The router/hub 34 and the router 36 can also be configured to transmit signals at a power level which is in excess of the power level which is required by a receiving computer for signal processing. The self-powered access points are able to extract power from the received signals which is in excess of the minimum signal power required by a target computer for signal processing. In an alternative embodiment, both the router/hub and the router can also be configured to transmit power signals to the self-powered access points which are solely intended for the purpose of providing energy to the self-powered access points. Such a power signal transmission includes information which identifies the power signals, so that the self-powered access points acquire substantially all signal energy from the power signals. The transmission of power signals which are exclusively utilized for the purpose of power extraction is not preferred, because the transmission of the power signals increases network traffic.

Figure 2:
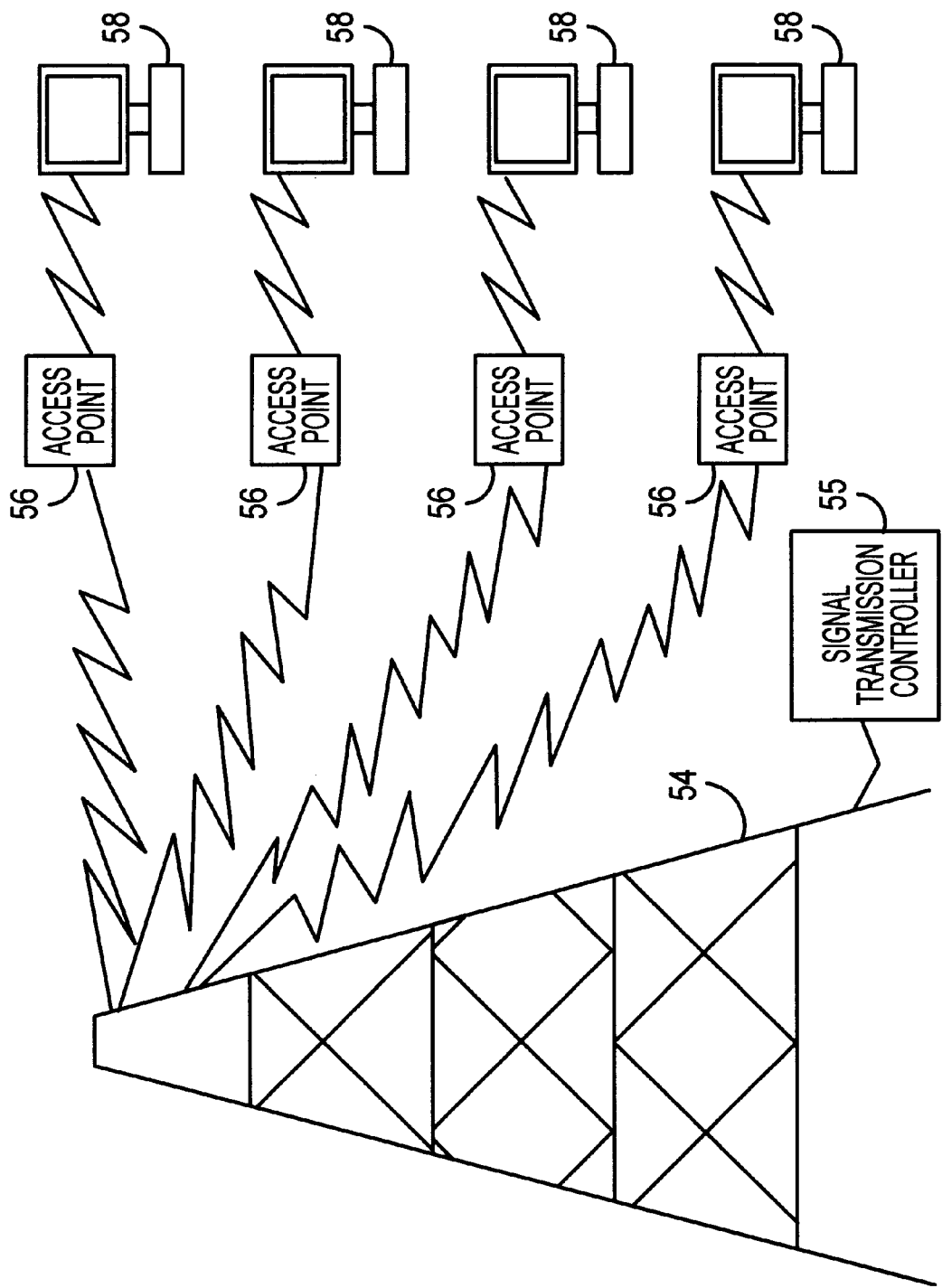
FIG. 2 is an alternative embodiment of the system in FIG. 1, which utilizes wireless signal transmission to derive operating power for the network devices.

In a preferred embodiment, the self-powered access points are located on a local area network (LAN), such as a 10 base-T-LAN having twisted pair copper wires for signal transmission. Alternatively, the self-powered access points can be located on a network utilizing fiber optic cable, coaxial cable, or wireless signal transmission. With reference to FIG. 2, in an alternative embodiment wireless self-powered access points 56 are located within a transmission range of a wireless base station 54 of a wireless communications network, such as a wireless LAN with each self-powered access point providing network access to an associated computer 58. Each self-powered access point can provide network access to more than one computer or other network device. A signal transmission controller associated with the wireless base station 55 provides routing functions and is connected to an external power source (not shown) for wireless signal transmission. In this alternative embodiment, the self-powered access points are adapted for extracting electrical power from wireless signal transmissions received from the base station. The invention may also be used in other types of networks, such as a metropolitan area network (MAN) or a wide area network (WAN).

Figure 3:
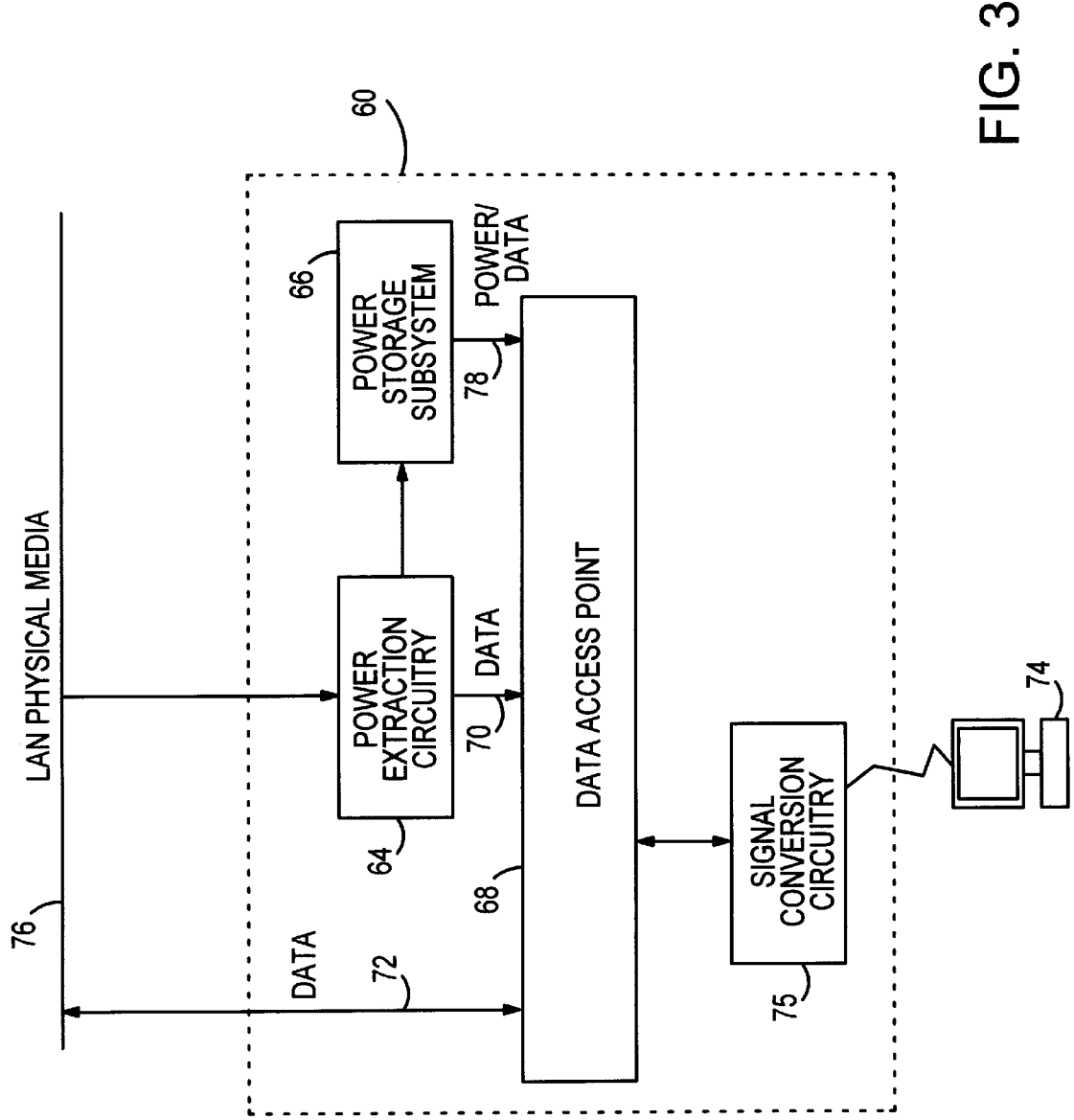
FIG. 3 is a block diagram of a first embodiment of a self-powered network access point according to the present invention.

Referring to FIGS. 1 and 3, a self-powered access point 60 includes power extraction circuitry 64 which is connected to the physical media of a LAN 76, for instance a twisted wire pair. In one embodiment, the power extraction circuitry includes a transformer connected to the twisted wire pair and inductively coupled to a rectifier circuit. The transformer steps up the voltage of the received signal to a voltage which is suitable for a self-powered access point power supply. The rectifier circuit converts the alternating current associated with the incoming signals to a direct current which is stored in a power storage subsystem 66, which can be either a capacitor or a rechargeable battery (e.g., a NiCad battery). Alternatively, the power extraction circuitry can include multiple capacitors connected in series to the twisted wire pairs and inductively coupled to the rectifier circuit, which stores the charge associated with the received signal in the power storage subsystem. Alternative circuitry is utilized to extract electrical energy from signals received over communications networks which utilize alternative transmission media, such as fiber-optic cable, coaxial cable, and wireless transmission media. Power extraction circuits for acquiring electrical energy from signals received over such transmission media are known in the art and will not be discussed in greater detail herein.

In one embodiment of the invention, the power extraction circuitry is configured to acquire only surplus signal energy from received signals. The surplus energy, which is in excess of the signal power level required for signal processing by a computer 74 attached to the self-powered access point, is then stored in the power storage subsystem 66, to provide operational power to the signal conversion circuitry. The network device from which the signals are transmitted, for instance the router/hub 34 or the router 36, transmits the signals at a power level in excess of the minimum signal power level, so that the power extraction circuitry is able to extract energy from received signals while preserving sufficient signal power to permit an associated computer 74 to process the signals. Because the energy acquired by the power extraction circuitry is surplus energy contained in network signals utilized by computers in communicating over the network, network traffic is not increased solely for the purpose of providing a source of power to the self-powered access points. The power extraction circuitry includes a first data connection 70 to a data access point 68 over which data required for processing by the associated computer 74 can be transmitted. A second data connection 72 enables signal transmission and reception from the associated computer over the LAN. Signal conversion circuitry 75 reconfigures network signals addressed to and received from the associated computer 74. In FIG. 3 the signal conversion circuitry converts network signals addressed to the computer to a format for wireless transmission and reconfigures wireless data received from the computer 74 to a format compatible with transmission over the twisted wire pair physical media of the LAN 76.

Figure 4:
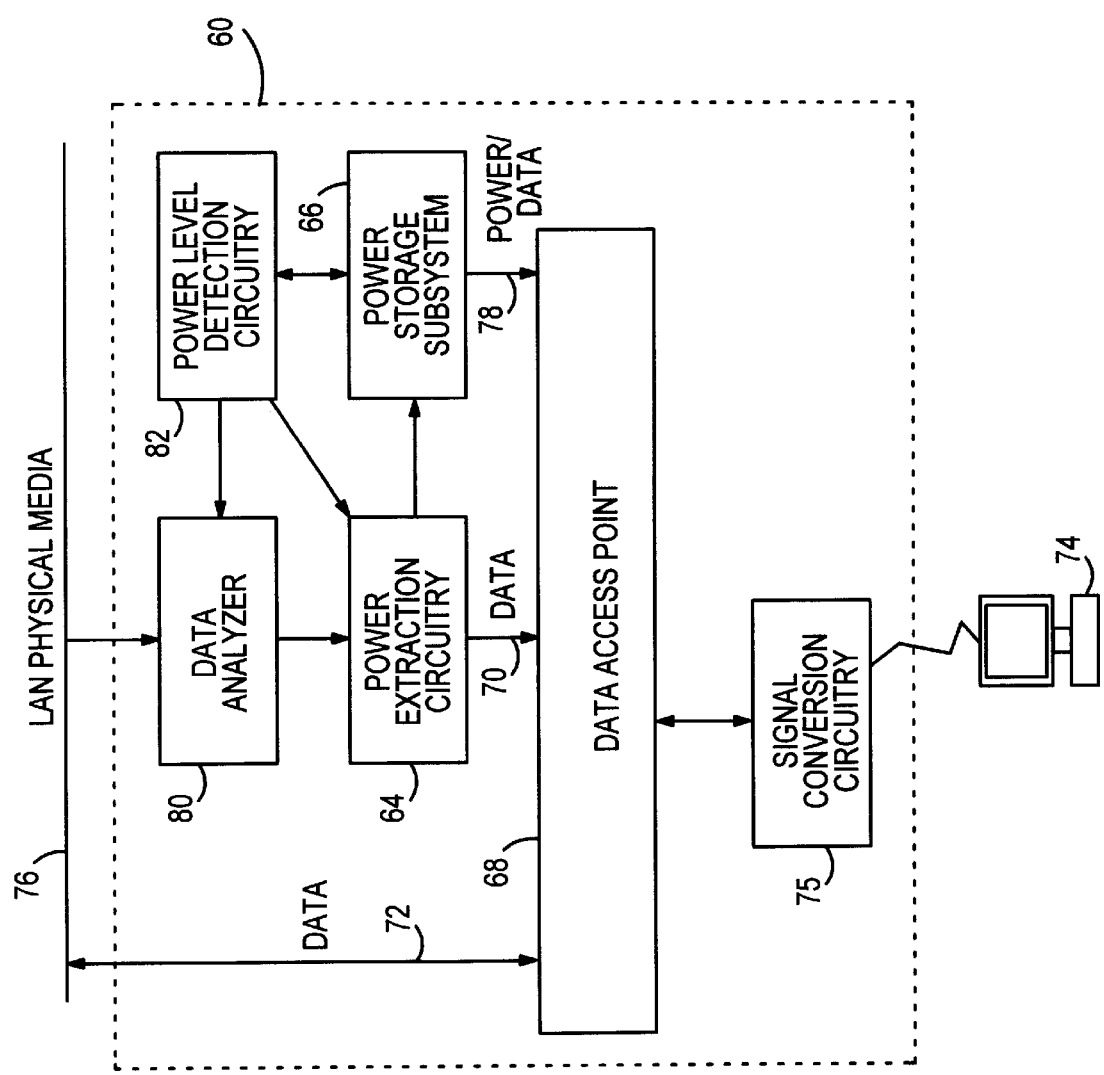
FIG. 4 is a block diagram of a second embodiment of the self-powered access point shown in FIG. 3.

With reference to FIG. 4, a preferred embodiment of the self-powered access point includes a data analyzer 80 adapted for identifying data contained in received signals which indicates whether the data is targeted to the computer 74 associated with the self-powered access point 60. For example, the data analyzer may be configured to examine header information of data packets that are used in conventional network environments to transfer data. Signals which are determined to be targeted to the computer must have the minimum signal power level to allow the signals to be reliably processed by the computer, whereas signals which are determined to be targeted to another computer on the network can be drained of substantially all power by the power extraction circuitry 64 for storage in the power storage subsystem 66.

In operation, the data analyzer 80 receives data which has been broadcast over the first LAN 30 and/or the second LAN 32. The router/hub 34, when broadcasting the data, includes information which indicates to which particular computer the data is targeted. The data analyzer determines whether the data is targeted for the computer 74 associated with the self-powered access point 60 or to another computer on the LAN. In a preferred embodiment, the power extraction circuitry includes a partial power extraction mode and a full power extraction mode. The partial power extraction mode is enabled by the data analyzer 80 upon determining that the received data is targeted to the computer. The full power extraction mode is enabled by the data analyzer if the data analyzer fails to detect any data targeted to the attached computer or if the power level stored in the power storage subsystem falls below a minimum level. When the partial extraction mode is enabled, the power extraction circuitry 64 only extracts surplus energy from the received signals, so that the signals retain the minimum signal power required by the associated computer to reliably process the signals. The remaining signal power can be provided directly to the signal conversion circuitry 75 for signal conversion, or the remaining signal power can be stored in the power storage subsystem 66 prior to signal conversion. When the full power extraction mode is enabled, the power extraction circuitry extracts substantially all power from received signals. In this preferred embodiment, the router/hub 34 and the router 36 transmit signals with a signal energy level over the minimum signal energy level to enable power extraction by power extraction circuitry while operating in the second mode. The signal energy level of the signals transmitted by the router and the router/hub can be varied to accommodate power requirements of devices connected to the self-powered access points.

In an alternative embodiment, the data analyzer 80 is configured to simply disable the power extraction circuitry 64 upon detecting data which is targeted to the computer associated with the self-powered access point. If the data analyzer determines that the received data is not targeted to the attached computer, the data analyzer enables the full power extraction mode in the power extraction circuitry which extracts substantially all signal energy from received signals.

Upon first being enabled, the power storage subsystem 66 has not accumulated enough charge to enable operation of the signal conversion circuitry 75. Before the power storage subsystem can supply the signal conversion circuitry with power, the power storage subsystem must first accumulate a minimum charge. Power level detection circuitry 82 monitors the power accumulated by the power storage subsystem to determine whether the power storage subsystem has accumulated the minimum power. Upon detecting power storage subsystem power level below the minimum, the power level detection circuitry disables the power connection 78, to a data access point 68, so that charge in the power storage subsystem can be rapidly accumulated. While not shown, the computer 74 is powered by an external power supply, such as a battery.

Upon detecting a sub-minimum power in the power storage subsystem 66, the power level detection circuitry further disables the data analyzer 80 and enables the full power extraction mode in the power extraction circuitry 64. Consequently, the power extraction circuitry extracts substantially all energy from all received signals, regardless of whether the data comprising the signals is required for processing by the computer. In this manner, the self-powered access point 60 is able to rapidly accumulate charge in the power storage subsystem in order to start providing power to the signal conversion circuitry 75 as soon as possible.

Figure 5:
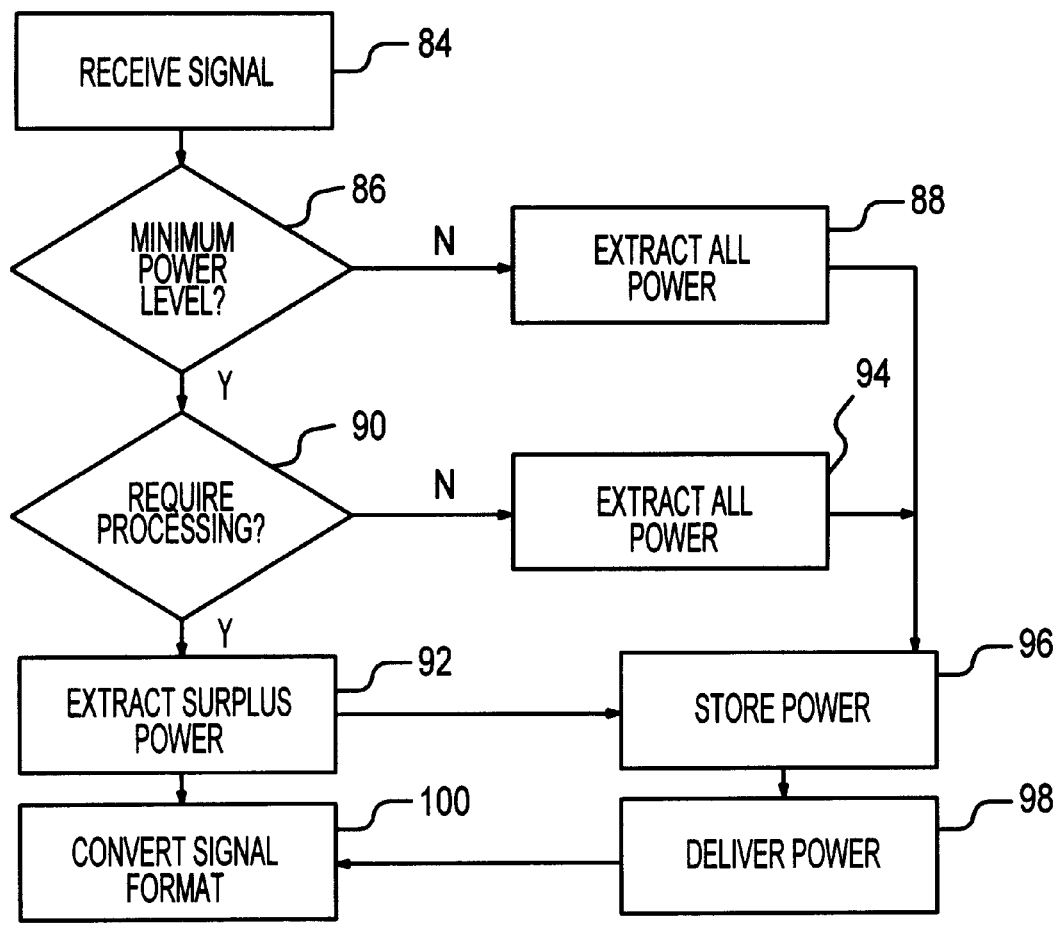
FIG. 5 is a process flow of a method for providing operating power to network devices from power extracted from network signals.

With reference to FIGS. 4 and 5, a method for utilizing network signals to provide operating power to the self-powered access points includes the step 84 of receiving a network signal at the self-powered network access point. The detection circuitry 82 is utilized in step 86 to determine whether a minimum charge has been accumulated in the power storage subsystem 66. If the minimum charge has not been accumulated, for instance when the self-powered network access point is first enabled, the power level detection circuitry disables the data analyzer 80 and the power connection 78 to the computer and enables the full power extraction mode in the power extraction circuitry 64. Disabling the data analyzer prevents the data analyzer from activating the partial power extraction mode in the power extraction circuitry in response to detecting data targeted to the attached computer 74. After the full power mode of the power extraction circuitry is enabled, in step 88 the power extraction circuitry extracts substantially all signal energy from the signals. The extracted energy is stored in the power storage subsystem in step 96.

Upon achieving the minimum charge in the power storage subsystem, the power level detection circuitry 82 enables the data analyzer and the power connection 78 to the signal conversion circuitry 75. If the network signal of step 84 is received when the power storage subsystem 66 has achieved the minimum charge, the enabled data analyzer 80 determines in step 90 whether the received signal is targeted for the computer and therefore requires processing. If the signal requires processing by the computer, the data analyzer enables the partial power extraction mode, and power extraction circuitry 64 only extracts the surplus energy from the received signal in step 92 to preserve the minimum signal power required by the computer for signal processing. If the data analyzer determines that the received signal is not required by the attached computer 74 for processing, the data analyzer enables the full power extraction mode in the power extraction circuitry in step 94.

After the surplus power extraction step 92, the extracted power is stored in the power storage subsystem 66 in step 96 and the stored power is delivered to the self-powered access point in step 98. The remaining signal power is either directly processed by the signal conversion circuitry 75 in step 100 to convert the signal to a wireless format or it can be stored in the power storage subsystem 66 prior to signal conversion.

Alternatively, the determination of whether the received signal is required by the computer for processing can be eliminated, so that all signals, regardless of whether they are targeted for the computer or not, only have their surplus energy extracted. The disadvantage of not determining whether a received signal requires processing is that only surplus energy is extracted from signals which do not require processing, as opposed to substantially all power being extracted from these signals. Once the power is extracted from the received signals, the power is stored in the power storage subsystem in step 96, and the stored power is delivered in step 98.

The self-powered access points advantageously enable extraction of power from network signals to provide operating power to self-powered network access points. Consequently, the considerable expense of providing external power to each network access point is avoided. The communications network is able to utilize network signals, for instance broadcasted signals, as a power source which was previously disregarded as a potential energy source. Furthermore, utilizing a remotely located and externally powered router as a source of signals for power extraction potentially provides separation of a self-powered access point from a local power source. Consequently, if the local power source fails, the self-powered access point, which derives power from the network, will continue to be operable so long as the router's power source remains enabled.

What is claimed is:

1. A method for providing operating power to a network device on a communications network comprising the steps of:

receiving network data signals at a location of said network device via said network;

extracting signal energy from at least some of said network data signals, including leaving a predetermined minimum power in said network data signals to allow processing of said network data signals;

storing said extracted signal energy in a power storage subsystem, thereby forming a reserve of power; and delivering at least a portion of said power in said reserve to a power input of said device, such that said power is accessible by said network device for operation thereof.

2. The method of claim 1 further comprising the step of utilizing said delivered power to convert a subset of said network data signals which are targeted to a communication device into a format for transmission to said communication device and to convert signaling information received from said communication device into a format for transmission over said network.

3. The method of claim 2 wherein said step of extracting power includes:
   determining whether each network data signal is targeted for processing by said communication device;
   preserving sufficient power in said each network data signal to allow processing of said signal by said communication device if it is determined that said signal requires processing by said communication device; and
   extracting substantially all signal energy of said network data signal if it is determined that said network data signal does not require processing by said communication device.

4. The method of claim 3 wherein said preserving step includes extracting surplus power from said signal, said surplus power representing an excess above a predetermined minimum signal power level required by said communication device for signal processing.

5. The method of claim 3 wherein said determining step occurs only after a minimum amount of power has been stored in said power storage subsystem, the method further comprising the step of extracting substantially all signal energy from any said network data signal received prior to storing said minimum power in said power storage subsystem.

6. The method of claim 1 wherein said extracting step includes:
   monitoring said network data signals received over said network for network maintenance signals; and
   selectively extracting signal energy from said network maintenance signals.

7. The method of claim 1 wherein said step of storing said power includes storing said power in one of a battery and a capacitor arrangement.

8. A system for providing network access to a communication network comprising:
   a power extractor configured for extracting a portion of signal energy from first signals transmitted over said communication network, said portion representing an excess over a minimum power level required for processing of said first signals;
   a power storage subsystem having an input in communication with an output of said power extractor to store said extracted electrical power; and
   a power output having an adaptor for connecting to a network device, said power output being enabled to relay sufficient electrical power from said power storage subsystem to said network device for operation of said network device on said network.

9. The system of claim 8 wherein said network device is a network access point comprising signal conversion circuitry responsive to reception of a first subset of said first signals addressed to a communication device to convert said first subset of first signals to a format for transmission to said communication device, said signal conversion circuitry being configured to convert data received from said communication device to a format for transmission over said communication network.

10. The system of claim 8 wherein said power extractor is configured to selectively extract electrical power from a second subset of said first signals, said subset including network maintenance signals.

11. The system of claim 9 wherein said communication device is a computer and said power extractor has first and second operational modes, said first operational mode being enabled prior to said power storage subsystem achieving a minimum power storage level, said power extractor being configured to extract substantially all signal energy from said first signals while in said first operational mode, said second operational mode being enabled upon said power storage subsystem achieving said minimum power storage level wherein said power extractor is configured to extract only a portion of signal energy from said first subset of said first signals, said portion representing an excess over a minimum power level required by said computer for signal processing.

12. The system of claim 11 further comprising:
   a data analyzer configured to enable said second operational mode of said power extractor in response to detecting said first subset of said first signals; and
   power level detection circuitry in communication with said power extractor and said data analyzer and for detecting power levels in said power storage subsystem below and above said minimum power storage level, said power level detection circuitry being responsive to detection of a power level below said minimum power storage level to enable said first operational mode and disable said data analyzer, said power level detection circuitry being configured to enable said data analyzer in response to detecting a power level above said minimum power storage level.

13. The system of claim 12 wherein said power extractor includes a third operational mode enabled by said data analyzer in the absence of detecting said first subset of said first signals, said power extractor being configured to extract substantially all signal energy from said first signals while operating in said third mode.

14. The system of claim 8 wherein said power storage subsystem comprises one of a capacitor arrangement and a battery.

15. The system of claim 8 wherein said power extractor is configured to extract said power from said first signals received via one of a coaxial cable, twisted wire pair, fiber optic cable, and wireless signal transmission.

16. A system for providing network access to communication devices utilizing power derived from network signals transmitted over a communication network comprising:
   a signal transmission device having an external power supply and means for transmitting first signals over said network;
   a plurality of self-powered access points on said network, each self-powered access point comprising:
   a) means for receiving said first signals;
   b) signal power extraction circuitry for extracting power from at least some of said first signals transmitted by said signal transmission device such that said first signals retain a minimum power level required for processing of said first signals, said signal power extraction circuitry being in communication with said receiving means;
   c) a power storage device connected to said signal power extraction circuitry for storing said extracted power; and
   d) a signal conversion device electrically coupled to said power storage device to receive operating power therefrom, said signal conversion circuitry being configured to convert a subset of said first signals addressed to a communication device to a format for transmission to said communication device, said signal conversion circuitry being responsive to reception of data transmitted by said communication device to reconfigure said data for transmission over said communication network.

17. The system of claim 16 wherein said each self-powered access point includes a data analyzer configured to detect said subset of said first signals, said signal power extraction circuitry having a first mode enabled by said data analyzer in response to detection by said data analyzer of said subset of first signals, wherein said first mode is limited to extracting only surplus power from said communication signals such that said subset of first signals retain a selected reduced power level required by said communication device for signal processing, said signal power extraction circuitry having a second mode expanded to extract substantially all power in said first signals received over said network in the absence of said data analyzer detecting said subset of said first signals.

18. The system of claim 17 wherein said each self-powered access point includes power level detection circuitry configured to enable a third mode of signal power extraction circuitry in response to detection of a power level in said power storage device below a minimum power level required for operation of said signal conversion device, said signal power extraction circuitry being configured to extract substantially all signal energy from all said first signals while operating in said third mode.

19. The system of claim 16 further comprising a data analyzer configured to enable a second mode of operation in said signal power extraction circuitry in the absence of detecting said subset of said first signals wherein said signal power extraction circuitry is configured to extract substantially all signal energy from all said first signals except said subset of said first signals while operating in said second mode, said data analyzer being configured to disable said signal power extraction circuitry in response to detecting said subset of said first signals.

* * * * *